United States Patent [19]

Stofer

[11] 4,396,560
[45] * Aug. 2, 1983

[54] PROCESS FOR THE CONTINUOUS REMOVAL OF UNDESIRABLE COMPONENTS OF SOLID PARTICLES BY A SOLVENT APPLIED IN COUNTERFLOW

[75] Inventor: Bernard Stofer, Turgi, Switzerland

[73] Assignee: Gesellschaft zur Förderung der Forschung an der Eidgenössisschen Technischen Hochschule, Zurich, Switzerland

[*] Notice: The portion of the term of this patent subsequent to Dec. 8, 1998, has been disclaimed.

[21] Appl. No.: 207,027

[22] Filed: Nov. 14, 1980

Related U.S. Application Data

[63] Continuation of Ser. No. 7,375, Jan. 29, 1979, Pat. No. 4,304,742.

[30] Foreign Application Priority Data

Mar. 3, 1978 [CH] Switzerland .......................... 2296/78

[51] Int. Cl. .............................................. G21C 21/00
[52] U.S. Cl. ................... 264/0.5; 23/293 R;
134/25.1; 252/634; 422/261; 422/903;
[58] Field of Search ..................... 134/25.1; 23/293 R;
252/634; 264/0.5; 422/261, 903

[56] References Cited

U.S. PATENT DOCUMENTS

| 2,740,707 | 4/1956 | Herrmann | 422/261 X |
| 2,813,781 | 11/1957 | Mertes | 422/261 X |
| 2,885,270 | 5/1959 | Karcher et al. | 422/261 X |
| 3,252,765 | 5/1966 | de Lara et al. | 422/261 |
| 3,467,576 | 9/1969 | Clark | 422/261 X |
| 4,163,837 | 8/1979 | Rush | 23/293 R |
| 4,304,742 | 12/1981 | Stofer | 264/0.5 |

FOREIGN PATENT DOCUMENTS 579001 11/1977 U.S.S.R. .............................. 422/159

*Primary Examiner*—Leland A. Sebastian
*Attorney, Agent, or Firm*—Watson, Cole, Grindle & Watson

[57] ABSTRACT

A cyclical and automatable process and apparatus for continuously removing undesired components from solid particles by means of a solvent, the process including maintaining an expanded bed of solid particles in a vertical column, supplying a suitable solvent to the bed to flow through the bed either upwardly or downwardly in a selectably alternating manner, supplying solid particles to the top of the column while the solvent flows upwardly therethrough and interrupting the supply of solid particles and removing a bottom portion of the bed by the solvent when it flows downwardly.

4 Claims, 1 Drawing Figure

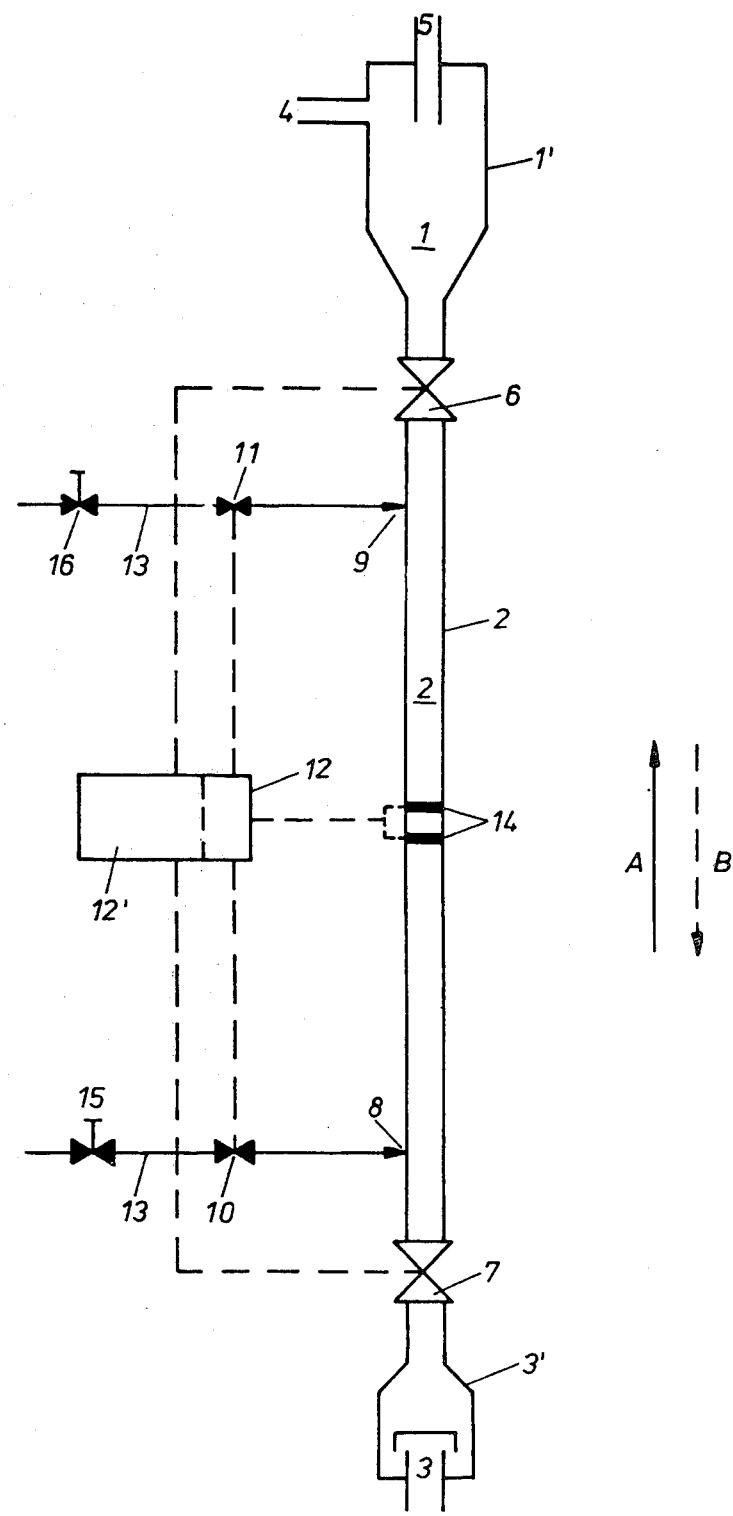

PROCESS FOR THE CONTINUOUS REMOVAL OF UNDESIRABLE COMPONENTS OF SOLID PARTICLES BY A SOLVENT APPLIED IN COUNTERFLOW

CROSS REFERENCE TO RELATED APPLICATIONS

The present application is a continuation application of application Ser. No. 7,375, filed Jan. 29, 1979, now U.S. Pat. No. 4,304,742.

BACKGROUND OF THE INVENTION

1. Field of the Invention

The invention concerns a process for the continuous removal of undesirable components from solid particles, and is particularly directed to for the removal of soluble components from microsphere material to be used for the production of nuclear fuel, the soluble components being removed using a solvent streaming through a bed of the microsphere material in counterflow. The invention also is directed to an apparatus for performing the process.

2. Description of the Prior Art

In nuclear reactor technology a particulate material containing thorium, uranium or plutonium is used in the manufacture of nuclear fuel. In this regard, fuel elements used in gas-cooled high-temperature reactors are formed of a graphite matrix in which fission or breeder materials in the form of coated microspheres are embedded. Also, the loading of fuel rods used in light water and breeder reactors can be carried out with a particle-shaped fuel (Spherepac-Fuel). The diameter of such particles is in general in the range between 50 $\mu$m and 5 mm.

As a rule, such microspheres are produced by wet-chemical methods. In these processes the microspheres are cast, whereby a solution of suitable composition separates into drops and undergoes a chemical process resulting in the solidification of the drops. The solidified drops (microspheres) are as a rule of a gel-like consistency and thus not very resistant to mechanical stresses.

After solidification the microspheres will generally still contain by-products which have to be eliminated from the microspheres before they are further processed. This is achieved by dissolving the undesirable components in a suitable solvent.

The microspheres used for the production of nuclear fuel contain toxic, radioactive components, a part of which is carried over into the solvent in the course of the dissolution of undesirable components. The used solvent, however, can only be permitted to be released into the environment after special conditioning treatment and is therefore mostly recycled. Consequently, for economical and ecological reasons, solvents should be used as sparingly as possible, i.e., the solvent should be charged with foreign bodies to the maximum possible extent. For the treatment of such particles, systems involving continuous counterflow are used.

In known apparatuses for the continuous removal of soluble components of solid particles, the solid substance is carried in counterflow in a stream of solvent either by a device in the fill of solid material or by a conveying device for the solid material.

To the first group belong equipment using a screw conveyor (Hildebrandt Extractor). In such equipment, since the product of extraction is exposed to mechanical stresses caused by the movement of the screw, the purification of microspheres in such devices can cause damage to or even destruction of the product.

To the second group of equipment belong extractors fitted, among others, with a conveyor belt, a bucket elevator and a bucket-wheel. These extractors are mechanically complicated and are, as a rule, unsuitable for products that are too delicate for mechanical handling. Furthermore, in handling radioactive materials there are additionally decontamination problems which, for this kind of apparatus, are difficult to solve and are accordingly expensive.

In other known processes a solvent is forced through a solid bed made up of the particles to be purified. Experiments have shown that the pressure drop across the solid bed can also damage the mechanically delicate microspheres. In addition, as is known, in the case of solid beds there is a risk of channel-forming. In such cases, the solvent no longer flows uniformly through the pile or fill of microspheres but rather it flows through the individual channels in the bed of microspheres so that the particles are not sufficiently purified.

The object of the present invention is therefore to eliminate or reduce the drawbacks of the known processes and to provide a process and apparatus which can vouchsafe that undesirable components are substantially eliminated from mechanically delicate solid particles while maintaining their shape.

SUMMARY OF THE INVENTION

According to the invention the process for the continuous removal of undesirable components from solid particles is characterised by the cyclical sequence of the following process steps:

(a) loading the solid particles into a static column of solvent through an upper decanter zone which, e.g. is widened relative to the column;

(b) sustaining an expanded bed of solid particles in the column by a stream of solvent flowing at a predetermined velocity introduced into the column at its base and removed from the decanter zone, whereby the inflowing solvent is pure and the outflowing solvent is charged with undesirable components washed out from the solid particles;

(c) interruption of the charging of solid particles and the supply of solvent at the upper and at the lower end of the column of solvent, respectively, opening the solvent column at the lower end and supplying solvent to the upper end of the column, unloading a lower section of the bed of solid particles in the column via its open lower end by a stream of solvent directed downwardly in the column, and (d) interrupting the discharge of solid particles at the lower column end and the feeding of solvent to the upper end of the column and opening of the solvent column both at the upper end for feeding in a charge of solid particles and at the lower end for feeding in solvent.

For the purpose of automation of the process, the concentration of the components dissolved in the solvent can be measured at at least one position of the column between the upper and the lower solvent feed inlets, preferably by determination of the electrical conductivity of the solvent and a changeover of the feeding of the solvent from the lower end to the upper end of the solvent column is controlled according to the measured values of conductivity. The supply of the solvent into the column at its lower end can be carried out during a first predetermined time period, and the downwards movement of the bed of solid particles for the discharge by means of the feeding-in of solvent into the column at its upper end can be carried out during a second predetermined time period so that the individual process steps are automatically repeated in each process cycle and in any discretionally selected number of cycles.

According to the invention, apparatus suitable for carrying out the process is characterised in that it consists of a vertical tube fitted at each of its ends with a respective inlet for feeding in a solvent and with a respectively essentially coaxial valve for charging in and discharge of solid particles; an essentially coaxial decanter vessel with a filling hole for solid particles arranged over the upper inlet valve for charging in the solid particles and with an overflow for the solvent, a discharge device arranged under the lower outlet valve for the discharge of solid particles and a valve arrangement connected to the solvent inlets for the alternate supplying of solvent into the column through one or the other inlet of the tube.

At least one measuring device for the determination of the concentration of the undesirable components of the solid particles can be arranged between the two inlets of the tube whereby expediently a device for measuring of the electrical conductivity of the solvent is used. For the purpose of automation of the device, the apparatus can be provided with a control unit which, in accordance with the signals of the measured values obtained from the measuring device controls the valve arrangement for the changeover of the supply of the solvent into the standpipe and, according to a planned time schedule controls the duration of the charging of the solid particles via the inlet valve and the duration of the discharge of the solid particles via the outlet valve.

One application of the process is the preparation of nuclear fuel. The nuclear fuel containing thorium, uranium or plutonium is passed into the solvent column in the form of solid particles and the column is filled with a solvent which dissolves the undesirable soluble components of the particles of nuclear fuel. The process is particularly advantageous when the nuclear fuel particles consist of wet-chemically produced microspheres.

BRIEF DESCRIPTION OF THE DRAWING

The invention is further explained in detail purely by way of example in the accompanying drawing, the single FIGURE of which is a diagrammatical illustration of a preferred embodiment of apparatus for performing the process according to the invention.

DESCRIPTION OF THE PREFERRED EMBODIMENT

As can be seen from the drawing, the illustrated apparatus for the continuous elimination of undesirable components from solid particles by use of a solvent comprises an extraction-column which forms of a decanter zone 1, a charging zone 2 and a discharging zone 3.

The extraction column consists of, e.g., a standpipe or vertical tube 2' forming the charging zone 2, a decanter vessel 1' located at the upper end of the tube 2' and which is, relative to the tube 2', essentially coaxial therewith (the vessel 1' including a larger or widened section and which constitutes the decanter zone 1), and a discharge device 3' (constituting the discharging zone 3) located at the lower end of the tube 2'.

The direction of flow of the solvent stream during the charging phase is indicated by an arrow A and the direction of the flow of the solid particles is indicated by an arrow B shown by a broken line.

The solid particles may, e.g. be microspheres obtained from the so-called Spherepac process of nuclear fuel manufacture. In this case, the by-product to be extracted is, e.g., ammonium nitrate and other soluble components. The solvent is in this case water or an aqueous solution of ammonia.

When operating the process certain conditions have to be observed and controlled, such as the composition of the liquid in the different zones, so that no insufficiently leached particles can pass out from the column.

The decanter vessel 1' has an overflow port 4 for the solvent. The solid particles are charged through an upper filling aperture 5 into the decanter vessel 1' and settle at the bottom of the decanter zone 1.

The charging zone 2 in the form of a preferably vertical tube 2' is bounded at the top by a particle inlet valve 6 and at the bottom by a particle discharge valve 7. A first, e.g. lateral, inlet 8 for the solvent is located at the lower end of the charging zone 2, above the particle discharge valve 7. The charging zone 2 is furthermore provided with a test or measuring position 14 for measuring changes in the conductivity of the solvent. At the upper end of the charging zone 2, there is a second inlet 9 for the solvent.

The first and second solvent inlets 8, 9 are connected to solvent supply line 13 via a respective solvent inflow control valves 10 and 11, each valve being controlled by a control unit 12. The supply line 13 is provided with respective regulating (e.g. needle) valves 15 and 16 for the separate or independent setting of the flow rate of solvent from below upwardly or from the top downwardly.

The discharging zone 3 has a device, e.g., a syphon, for preventing air from penetrating into the column while posing the least possible hindrance to discharging the washed or leached particles.

The measuring location 14 is connected to the control device 12 that controls the action of the valves 6, 7, 10 and 11.

When the column is in operation during the charging cycle, the particle inlet valve 6 and the lower solvent inlet valve 10 are open. The solvent or the flushing liquid streams through the column from the bottom upwardly and exits from the column at the overflow 4. Microspheres disposed in the decanter zone trickle into the charging zone until the latter is filled up. The gap ratio in the microsphere bed (ratio of total column less the volume of the microspheres to the total volume) can be set by the rate of flow of the solvent or flushing liquid at the lower regulating valve 15. To avoid formation of channels in the bed, particularly in the case of very fine particles (diameter of less than 1000 $\mu$m), the velocity of flow is set in such a way that an expanded bed is obtained in relation to a solid bed. The very fine particles entrained by the stream of the solvent or flushing/washing liquid are retained in the decanter zone due to the locally reduced velocity of the stream in the decanter zone that is widened relative to the charging zone.

If the conductivity of the flushing liquid at the measuring point 14 falls below a predetermined value, i.e., the concentration of the undesirable components in the microspheres between the discharge valve 7 and the measuring point 14 falls below a certain value, the particle charging valve 6 and the lower solvent inlet valve 10 are automatically closed and the particle discharge valve 7 and the upper solvent inlet valve 11 are opened. The stream of the solvent or flushing liquid causes the microsphere bed to be shifted downwardly by a certain distance with the liquid now flowing from the top downwardly towards the bottom; in this way, a portion of the washed microspheres is conveyed through the discharge zone 3. The length of the distance by which the bed is moved downwardly is determined on the one hand, by the magnitude of the downwardly flowing stream of liquid and on the other hand, by the duration of the time period during which the valves 7 and 11 remain open. After expiration of a stipulated time period, the particle discharge valve 7 and the upper solvent inlet valve 11 are closed and the particle charging valve 6 and the lower solvent inlet valve 10 are opened. At this stage, the unwashed microspheres from the decanter zone 1 trickle into the part of the charging zone 2 that was emptied during the discharging cycle. The operating sequence of the cycle is subsequently repeated, as described above.

The advantages of the described arrangement are that it has a simpler mechanical construction, hence it is suitable also for radioactive materials; it provides a gentle, careful handling of the microspheres since no mechanical transportation of the microspheres is necessary; no formation of channels is caused and only a small pressure drop across the bed since the gap ratio of the bed exists is automatically adapted to the velocity of flow of the flushing liquid. In many cases, the efficiency of the washing out of the microspheres may be further improved if the ascending stream of solvent is caused regularly or irregularly to pulsate to which end e.g., the open lower solvent inlet valve 10 is suitably set, preferably automatically.

EXAMPLE

| | |
|---|---|
| Height of column: | 1400 mm |
| Diameter of charging zone: | 15 mm |
| Height of charging zone: | 800 mm |
| Diameter of microspheres: | 300 $\mu$m |
| Solvent flow rate: | 1 l/h |
| Duration of the charging cycle: | 2 min |
| Duration of the discharge cycle: | 8 sec |
| Throughput of microspheres: | 300 g/h |
| Efficiency of washing-out of the microspheres: | 95% |

I claim as my invention:

1. A process for the removal of undesirable soluble contaminants from solid particles by passing a solvent for the contaminants through a bed of the contaminated solid particles, the process comprising the following sequential steps:
   (1) charging the contaminated solid particles into the upper end of a column of solvent by way of an upper decanter zone which has a greater diameter than that of the solvent column;
   (2) adding solvent to the solvent column near its lower end and causing the solvent to move at a predetermined rate upwardly, thereby causing the contaminated solid particles in the solvent column to form an expanded bed,
   (3) removing solvent with dissolved contaminants therein from the upper decanter zone,
   (4) after a first predetermined time period has passed, stopping the charging of contaminated solid particles to the top of the solvent column and the adding of solvent to the base of the solvent column,
   (5) adding solvent to the solvent column near its upper end and concurrently removing a section of the bed of solid particles from the lower end of the solvent column for a second predetermined time period,
   (6) at the conclusion of said second predetermined time period, stopping both the supply of solvent to the upper end of the solvent column and the removal of solid particles from the lower end of the solvent column, and
   (7) repeating steps (1)–(6).

2. A process according to claim 1, wherein said solid particles are particles containing thorium, uranium or plutonium.

3. A method according to claim 1, wherein said solid particles are gel-like.

4. A method according to claim 1 wherein said solid particles are in the form of microspheres produced by a wet-chemical process.

* * * * *